US007023109B2

(12) United States Patent
Amano (10) Patent No.: US 7,023,109 B2
(45) Date of Patent: Apr. 4, 2006

(54) UNINTERRUPTIBLE POWER SOURCE APPARATUS

(75) Inventor: Isao Amano, Nagano (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 10/487,767

(22) PCT Filed: Mar. 4, 2003

(86) PCT No.: PCT/JP03/02485

§ 371 (c)(1),
(2), (4) Date: Jul. 2, 2004

(87) PCT Pub. No.: WO03/075431

PCT Pub. Date: Sep. 12, 2003

(65) Prior Publication Data

US 2004/0233687 A1    Nov. 25, 2004

(30) Foreign Application Priority Data

Mar. 6, 2002  (JP) ............................ 2002-060976
Aug. 9, 2002  (JP) ............................ 2002-233345

(51) Int. Cl.
*H02J 7/00*    (2006.01)
*H02M 7/44*    (2006.01)

(52) U.S. Cl. .......................... 307/64; 307/44; 307/87; 363/17; 363/98

(58) Field of Classification Search ............ 307/64–66, 307/43, 44, 87, 55; 363/16, 17, 98, 132, 363/37, 34; 361/94, 93.4
See application file for complete search history.

(56) References Cited

U.S. PATENT DOCUMENTS 5,315,533 A * 5/1994 Stich et al. .................. 700/298
5,579,197 A * 11/1996 Mengelt et al. ............. 361/93.4
5,608,595 A * 3/1997 Gourab et al. ................ 361/79
5,612,580 A * 3/1997 Janonis et al. ................ 307/64
6,404,346 B1 * 6/2002 Jadric et al. ................ 340/635
6,570,780 B1 * 5/2003 Furukawa et al. ............ 363/98

FOREIGN PATENT DOCUMENTS

| EP | 0486130 A2 | 5/1992 |
| JP | 09-331684 | 12/1997 |
| JP | 2000-172351 | 6/2000 |
| JP | 2001-286078 | 10/2001 |

OTHER PUBLICATIONS

Simple Topologies For Single Phase AC Line Conditioning (Mar. 1, 1994) Chingchi Chen et al.

* cited by examiner

*Primary Examiner*—Rajnikant B. Patel
(74) *Attorney, Agent, or Firm*—Manabu Kanesaka (57) ABSTRACT

An uninterruptible power supply unit essentially includes: a DC power supply source 3, a parallel converter 4, and a series converter 6 that are individually connected in parallel to both ends of an electrolytic capacitor Cdc having a pair of capacitors C1 and C2. An input terminal Pin1 is connected to an intermediate point of the electrolytic capacitor Cdc. A power supply line 1n interlinking an input terminal Pin1 and an output terminal Pout2 is connected to multiple switching elements of the parallel converter 4 via a reactor Lin. Likewise, multiple switching elements of the series converter 6 are individually connected to an output terminal Pout1 via another reactor Lout. Multiple capacitors C individually constituting the above-described reactors L and filters are connected in parallel between the input terminals and output terminals. When any abnormality is generated in the AC input voltage, a controlling device activates operation of the parallel converter 4 so that input current Ipara flowing through the parallel converter 4 can become output current Iout, thereby generating a state equal to the case in which the input side of the AC power supply source has been disconnected from the power supply switch. Concurrently, the controlling device activates operation of the series converter 6 so that the output voltage Vout can become the series-voltage commanding value Vout*.

8 Claims, 8 Drawing Sheets

UNINTERRUPTIBLE POWER SOURCE APPARATUS

BACKGROUND OF THE INVENTION AND RELATED ART STATEMENT

The present invention relates to an uninterruptible power supply unit capable of continuously supplying electric power to a load using energy stored in electric power storage means when power service is interrupted.

Figure 8:
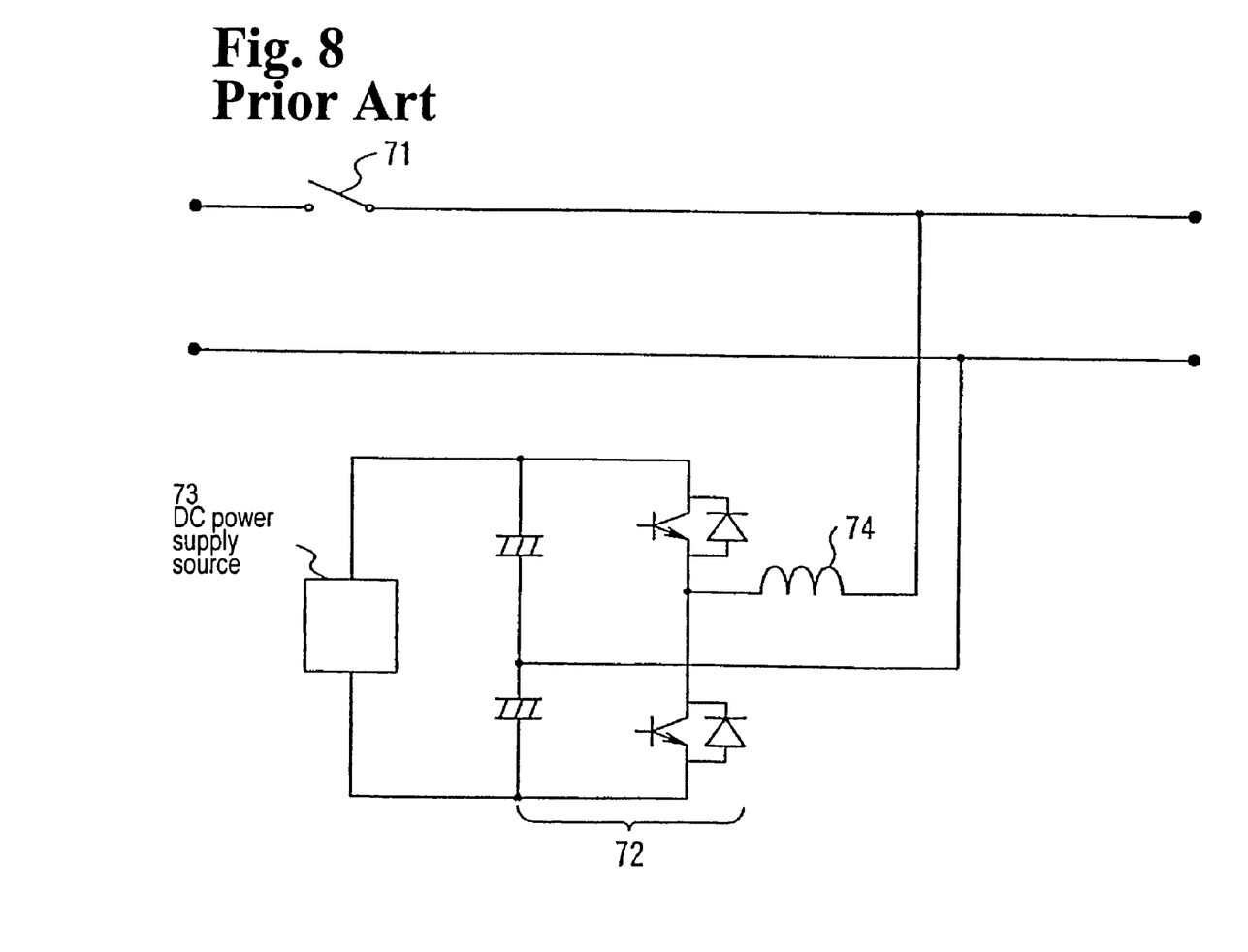
FIG. 8 is a circuit diagram showing an example of a conventional uninterruptible power supply unit.

As an uninterruptible power supply unit of this type, for example, an uninterruptible power supply unit based on a so-called SPS (stand-by power supply) system with high operating energy efficiency has been proposed. FIG. 8 shows an example thereof in which AC power from a commercial power supply source is supplied to a load (not shown) through a relay switch 71. A half-bridge-type converter 72 and a DC power supply source 73 are-connected to a power supply line for supplying AC input to the load in parallel relative to an AC power input terminal of the AC power from the commercial power supply source. Further, a reactor 74 is disposed between the power supply line and the converter 72. Two switching elements connected in series and two capacitors connected in series, for example, are connected to the converter 72 in parallel. Also, each of the switching elements is connected to a diode in opposite parallel.

When the AC power is supplied normally, the relay switch 71 is controlled in an electrically conductive state to supply the AC input to the load. On the other hand, when an abnormal condition occurs in the AC input due to power outage and the like, the relay switch 71 is controlled to shut off to disconnect a side of the commercial power supply from the power supply line. Then, using the DC power supply source 73 as an energy source, the converter 72 is operated as an inverter to generate specific AC power and supply the AC power to the load.

With the configuration described above, even in the event of power outage, AC power can be continuously supplied to the load.

Incidentally, in the SPS-type uninterruptible power supply unit described above, when the SPS system responds and shuts off the relay switch 71 in the event of power outage, there is a certain time lag about a few milliseconds to more than 10 milliseconds from a time when the power outage is detected to a time when the relay switch 71 is shut off.

At this time, there may be a case in which the uninterruptible power supply unit itself or a device linked to the same system may be adversely affected by over current flowing through a short-circuit portion.

Alternatively, in the event of power outage, a method has been proposed in which the converter 72 is temporally stopped to shut off the relay switch 71, and then the converter 72 is activated again. However, in this method, since the converter 72 is stopped until the relay switch 71 is shut off, there is a problem called "temporal shut off" in which the voltage output to the load is temporally stopped.

To prevent "temporal shut off", it is necessary to continuously operate the converter 72. In this case, however, it is possible to adversely affect a device due to the over current described above.

Accordingly, it is desired to provide a device and a method in which the above two problems are simultaneously solved.

Accordingly, the present invention has been created to solve the above problems, and an object of the present invention is to provide an uninterruptible power supply unit capable of preventing the adverse effect on a device due to the over current and the temporal shut-off of the output voltage when the AC power input side is disconnected upon a decline in the input voltage.

Further objects and advantages of the invention will be apparent from the following description of the invention.

SUMMARY OF THE INVENTION

To achieve the above objects, according to a first aspect of the present invention, an uninterruptible power supply unit includes a power supply switch interposed in a power supply line; a parallel converter disposed between the power supply switch and an output terminal of the power supply line and connected to an input terminal and the output terminal of the power supply line in parallel; an electrically conductive path disposed between said power supply switch and said parallel converter for connecting between the power supply lines; electric power storage means connected to said parallel converter; a series converter connected to said power supply line disposed between said parallel converter and said output terminal in series for adjusting said AC output voltage using said electric power storage means as an energy source so that the AC output voltage at said output terminal becomes a predetermined value; voltage abnormality detection means for detecting an abnormality in the input voltage of the AC power supplied to said input terminal; and controlling means for controlling an operation of said power supply switch and said parallel converter in response to a result detected by said voltage abnormality detection means; wherein said controlling means controls said power supply switch to be conductive, and also controls said parallel converter so that the energy stored in said electric power storage means becomes a predetermined voltage value when said voltage abnormality detection means detects no abnormality; and said controlling means shuts off said power supply switch and controls said parallel converter so that a value of a current flowing through said parallel converter matches a value of an AC output current at said output terminal when said voltage abnormality detection means detects an abnormality.

In the first aspect of the present invention, when an abnormality of the input voltage of AC power is not detected, the input AC power is output to the load as it is. At this time, the series converter connected to the power supply line in series adjusts the AC output voltage at the output terminal to be a predetermined value, and the AC output voltage is output to the load. When the energy stored in the electric power storage means is varied due to the voltage adjusting operation of the series converter, the parallel converter connected to the power supply line in parallel is operated to adjust the energy stored in the storage means to be a predetermined value, thereby maintaining the energy stored in the storage means at the predetermined value.

On the other hand, when an abnormality is detected in the input voltage of AC power due to power outage and the like, the power supply switch is controlled to shut off and the parallel converter is operated to match the value of the AC current flowing through the parallel converter to the value of the AC output current at the output terminal, that is, the input current of the AC power becomes zero. Accordingly, at the time when the parallel converter starts controlling to make the input current zero before the power supply switch is shut off, the input side of the AC power comes to a state equal to being disconnected from the power supply line. Further, the series converter is operated so that the AC output voltage becomes a predetermined value, so that a temporal shut-off does not occur in the event of power outage and a predetermined voltage value of the AC output voltage is output.

According to a second aspect, an uninterruptible power supply unit includes a power supply switch interposed in a power supply line; a parallel converter disposed between the power supply switch and an output terminal of the power supply line and connected to an input terminal and the output terminal of the power supply line in parallel; an electrically conductive path disposed between said power supply switch and said parallel converter for connecting between the power supply lines; electric power storage means connected to said parallel converter; an input reactor disposed between said input terminal of said power supply line and said parallel converter; a series converter connected to said power supply line disposed between said parallel converter and said output terminal in series for adjusting said AC output voltage using said electric power storage means as an energy source so that the AC output voltage at said output terminal becomes a predetermined value; voltage abnormality detection means for detecting an abnormality in the input voltage of the AC power supplied to said input terminal; and controlling means for controlling an operation of said power supply switch and said parallel converter in response to a result detected by said voltage abnormality detection means. The controlling means controls said power supply switch to be conductive, and also controls said parallel converter so that the energy stored in said electric power storage means becomes a predetermined voltage value when said voltage abnormality detection means detects no abnormality, and the controlling means shuts off said power supply switch and controls said parallel converter so that a value of the AC input current at said input terminal becomes lower than a predetermined allowable value when said voltage abnormality detection means detects an abnormality.

According to a third aspect of the present invention, in the uninterruptible power supply unit, said controlling means controls the parallel converter so that the value of said AC input current becomes zero when said voltage abnormality detection means detects an abnormality.

In the second or third aspect, when no abnormality is detected in the input voltage of AC power, the input AC power is output. At this time, the series converter connected to the power supply line in series adjusts the AC output voltage so that the AC output voltage at the output terminal becomes a predetermined value and is output. As a result, a predetermined value of voltage is output to the load to which the uninterruptible power supply unit supplies the power. When the energy stored in the electric power storage means is varied by the voltage-adjusting operation executed by the series converter, the parallel converter connected to the power supply line in parallel is operated to adjust the energy stored in the electric power storage means to be a predetermined value, thereby maintaining the energy stored in the storage means at a predetermined value.

On the other hand, when an abnormality is detected in the input voltage of the AC power, the power supply switch is shut off and the value of the AC input current at the input terminal is controlled to be below a predetermined allowable value, such as zero. Accordingly, at the time when the parallel converter starts controlling to make the input current zero before the power supply switch is shut off, the input side of the AC power is in a state equal to being disconnected from the power supply line. Further, the series converter is operated so that the AC output voltage becomes a predetermined value of the AC output voltage, so that a temporal shut-off does not occur in the event of power outage and the AC power with a predetermined voltage value of the AC output voltage is output continuously.

The above-mentioned allowable value is not limited to zero, and, for example, a current value is acceptable in which no adverse effect occurs on the uninterruptible power supply unit itself or a device connected to the uninterruptible power supply unit due to a current flowing through a short circuit portion when a short circuit and the like happens.

According to a fourth aspect of the present invention, in the uninterruptible power supply unit, the controlling means controls the parallel converter using a voltage at both ends of the electrically conductive path as an opposite voltage for improving control precision relative to the parallel converter. Also, electrically conductive path abnormality detection means is provided for detecting an abnormality in the voltage at both ends of the electrically conductive path, so that when the electrically conductive path abnormality detection means detects an abnormality in the voltage at both ends of the electrically conductive path, a predetermined rated voltage is used as the opposite voltage.

According to a fifth aspect the present invention, in the uninterruptible power supply unit, the predetermined rated voltage is set to be a value so that the voltage at both ends of the electrically conductive path can be a specific value within a compensating voltage range of the series converter when an abnormality occurs in the voltage at both ends of the conductive path.

According to a sixth aspect of the present invention, in the uninterruptible power supply unit, the preset predetermined voltage is zero voltage.

In the fourth to sixth aspects, the controlling means controls the parallel converter using a voltage at both ends of the electrically conductive path between the power supply lines disposed between the power supply switch and the parallel converter as the opposite voltage for improving the control precision relative to the parallel converter. In other words, the parallel converter is controlled based on the opposite voltage and a controlling signal for controlling such that the energy stored in the electric power storage means becomes a rated value. Since the controlling signal for controlling such that the energy stored in the electric power storage means becomes a rated value is very small relative to the opposite voltage, the controlling signal is controlled to be the opposite voltage.

Here, when an abnormality occurs in the input voltage and the input side of the AC power is opened, the voltage output of the parallel converter is detected as the voltage at both ends of the electrically conductive path. That is, since the parallel converter is controlled such that the output voltage is a target value, the output voltage of the parallel converter is maintained at a substantially constant value.

Accordingly, when the substantially constant value exceeds a range that the series converter can compensate, the series converter can not adjust the AC output voltage to be a predetermined value at the output terminal, thereby decreasing voltage. However, when an abnormality occurs in the input voltage, since the output voltage from the parallel converter is set to be a value at which the series converter can be compensated to be a predetermined value, i.e. zero, as the opposite voltage, the series converter can be compensated to be the predetermined value, thereby maintaining the AC output voltage at a predetermined value.

DETAILED DESCRIPTION OF PREFERRED EMBODIMENTS

Hereunder, embodiments of the present invention will be explained.

First, a first embodiment of the present invention is described below.

Figure 1:
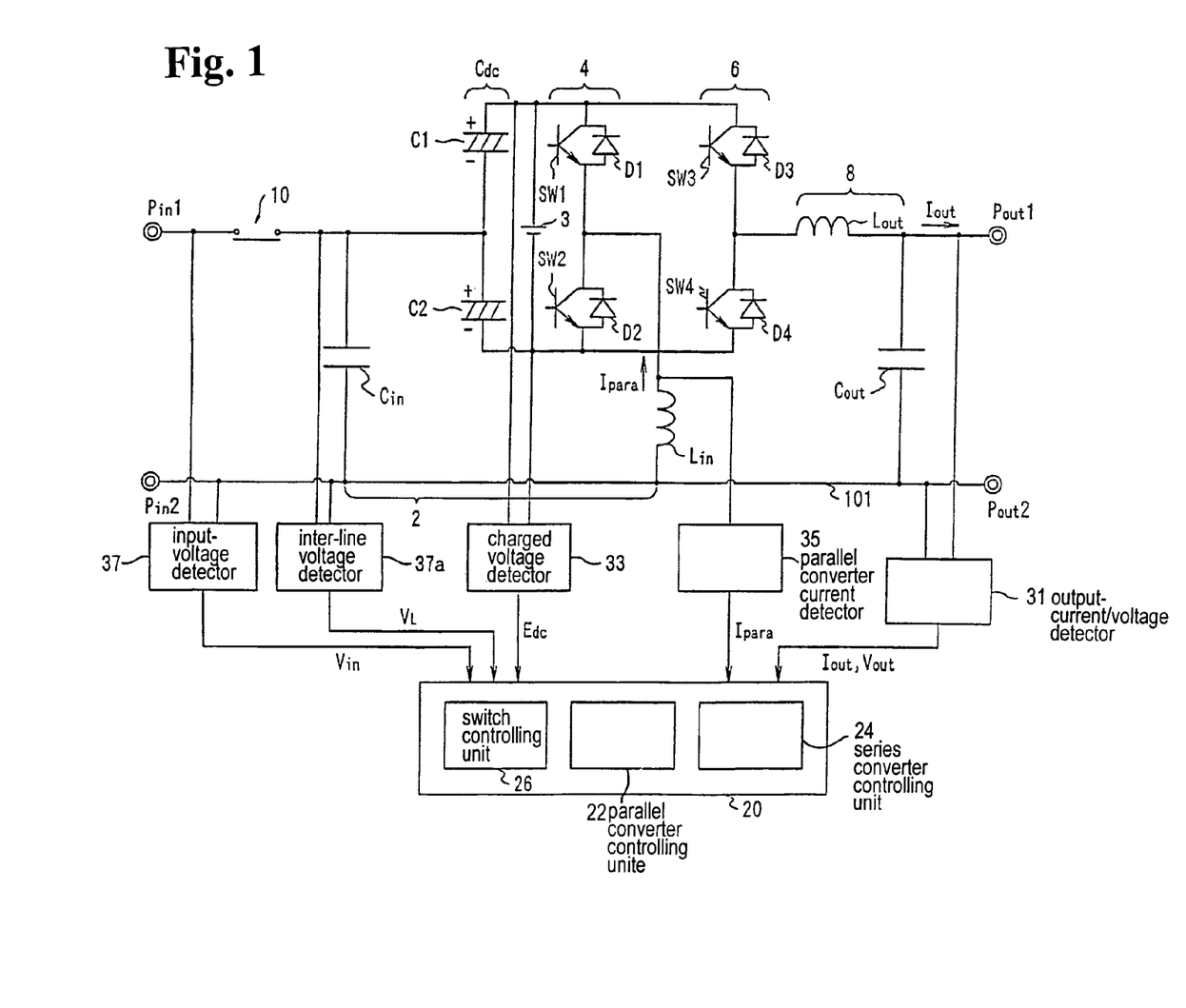
FIG. 1 is a schematic block diagram showing an example of an uninterruptible power supply unit according to a first embodiment of the present invention.

FIG. 1 is a schematic circuit diagram showing an example of an uninterruptible power supply unit according to the first embodiment of the present invention. As shown in FIG. 1, in the uninterruptible power supply unit, AC input from a commercial power supply source is supplied to a load (not shown) through a relay switch 10. The uninterruptible power supply unit comprises an electrolytic capacitor Cdc; a parallel converter 4 for charging and discharging the electrolytic capacitor Cdc; and a series converter 6 for adjusting a voltage so that an output voltage Vout to the load becomes an output voltage target value Vout* with the electrolytic capacitor Cdc and a DC power supply source 3 as a energy source.

The parallel converter 4 is formed of a half-bridge circuit, and a diode D1 and a diode D2 are connected to a switching element SW1 and a switching element SW2 connected together in series in opposite parallel, respectively. Likewise, the series converter 6 is formed of a half-bridge circuit, and a diode D3 and a diode D4 are connected to a switching element SW3 and a switching element SW4 connected together in series in opposite parallel, respectively.

A DC power supply source 3, the parallel converter 4, and the series converter 6 are connected in parallel in this order to both ends of the electrolytic capacitor Cdc comprising a capacitor C1 and a capacitor C2 with same storage capacity connected in series. A middle point and one input terminal Pin1 of the electrolytic capacitor Cdc are connected via the relay switch 10. One end of the reactor Lin is connected to a connection point of the switching elements SW1 and SW2 of the parallel converter 4, and the other end is connected to a power supply line 101 connecting the other input terminal Pin2 and an output terminal Pout2.

Further, a capacitor Cin is connected to the input terminals Pin1 and Pin2 in parallel at connection points between the relay switch 10 and the electrolytic capacitor Cdc, and between the input terminal Pin2 and the reactor Lin of the power supply line 101. The capacitor Cin and the reactor Lin constitute an LC filter 2.

A connection point of the switching elements SW3 and SW4 of the series converter 6 is connected to an output terminal Pout1 through a reactor Lout. A capacitor Cout is connected to the output terminals Pout1 and Pout2 in parallel at connection points between the reactor Lout and the output terminal Pout1, and between the reactor Lin and the output terminal Pout2 of the power supply line 101. The capacitor Cout and the reactor Lout constitute an LC filter 8.

It is arranged that a controlling circuit 20 controls the parallel converter 4, the series converter 6, and the relay switch 10.

The controlling circuit 20 comprises a parallel converter controlling unit 22 for controlling the parallel converter 4, a series converter controlling unit 24 for controlling the series converter 6, and a switch controlling unit 26 for controlling the relay switch 10.

Figure 2:
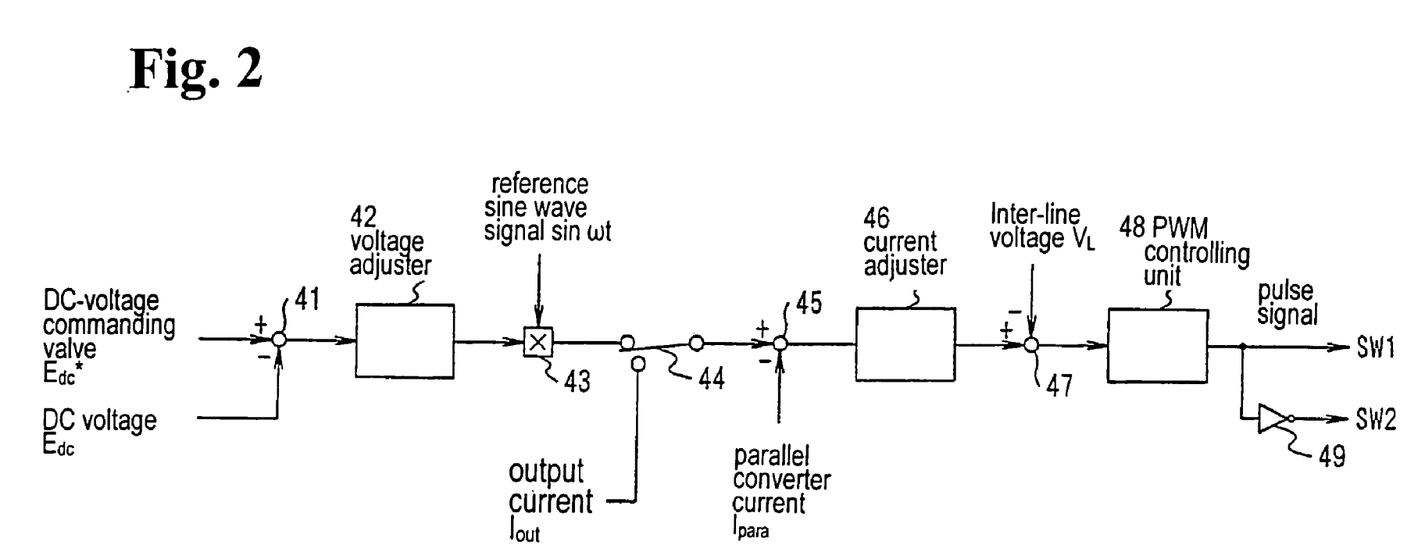
FIG. 2 is a block diagram showing a functional structure of a parallel converter controlling unit shown in FIG. 1.

FIG. 2 is a schematic block diagram showing a functional structure of the parallel converter controlling unit 22. As shown in FIG. 2, an arithmetic operator 41 detects a differential value between a specified DC voltage value Edc* as a target value of a voltage at both ends of the electrolytic capacitor Cdc and a DC-voltage Edc at both ends of the electrolytic capacitor Cdc detected by a charged voltage detector 33. A voltage adjuster 42 executes a voltage-adjusting arithmetic operation such as PI control, and an arithmetic operator 43 multiplies a result of the arithmetic operation and a reference sine wave signal sin ωt. Incidentally, the reference sine wave signal sin ωt is a signal with a phase synchronized with a inter-line voltage $V_L$, and an amplitude of the reference sine wave signal is arbitrarily determined, for example, in correspondence with a rated voltage of an input voltage Vin from a commercial power supply source.

A changeover switch 44 selects one of the multiplication result at the arithmetic operator 43 and a value of the output current Iout, and then the selected data is output to an arithmetic operator 45. A differential value is obtained by subtracting a current component Ipara (hereinafter referred to as parallel converter current) flowing through the parallel converter 4 detected by a parallel converter current detector 35 from one of a multiplication result at the arithmetic operator 43 and the output current Iout selected by the changeover switch 44, and the differential value is then output to a current adjuster 46. The current adjuster 46 executes a current adjust arithmetic operation such that a current value corresponding to the differential value between the specified DC voltage value Edc* and the DC voltage Edc matches the current value of the parallel converter current Ipara, or the current value of the parallel converter current Ipara matches the output current value Iout, and an executed result is input to an arithmetic operator 47. The inter-line voltage $V_L$ detected by an inter-line voltage detector 37a is input to the arithmetic operator 47 as an opposite voltage for improving control precision relative to the parallel converter, and a differential value between an executed result at the current adjuster 46 and the inter-line voltage $V_L$ is obtained.

Based on the executed result at the arithmetic operator 47, a PWM controlling unit 48 generates a pulse signal. At this time, the parallel converter 4 performs a rectifying operation, and a pulse signal is generated such that the parallel converter current Ipara becomes a specific current value corresponding to the differential value between the specified DC voltage value Edc* and the DC voltage Edc, or the parallel converter current Ipara becomes a real time value of the output current Iout. The pulse signal is then output as a signal for controlling the switching element SW1 of the parallel converter 4 and, at the same time, a logical-inversion circuit 49 inverts a PWM signal so that the inverted signal is output to control the switching element SW2.

The changeover switch 44 is controlled to output an output of the arithmetic operator 43 to the arithmetic operator 45 when the input voltage Vin detected by the input-voltage detector 37 is within a predetermined allowable range where the input voltage is considered to be normal. The changeover switch 44 is controlled to output a value of the output current Iout detected by the output-current/voltage detector 31 to the arithmetic operator 45 when the input voltage Vin exceeds the allowable range, i.e. above or below the allowable range.

That is, when the input voltage Vin is normal, the parallel converter controlling unit 22 controls the parallel converter 4 to operate as a PWM rectifier, and controls the parallel converter 4 through feeding back the parallel converter current Ipara so that the current flowing through the parallel converter 4, i.e. the parallel converter current Ipara, becomes a value corresponding to the differential value between the specified DC voltage value Edc* and the DC voltage Edc. On the other hand, when the input voltage Vin is an abnormal voltage, the parallel converter 4 is controlled so that the parallel converter current Ipara matches a value of the output current Iout.

Figure 3:
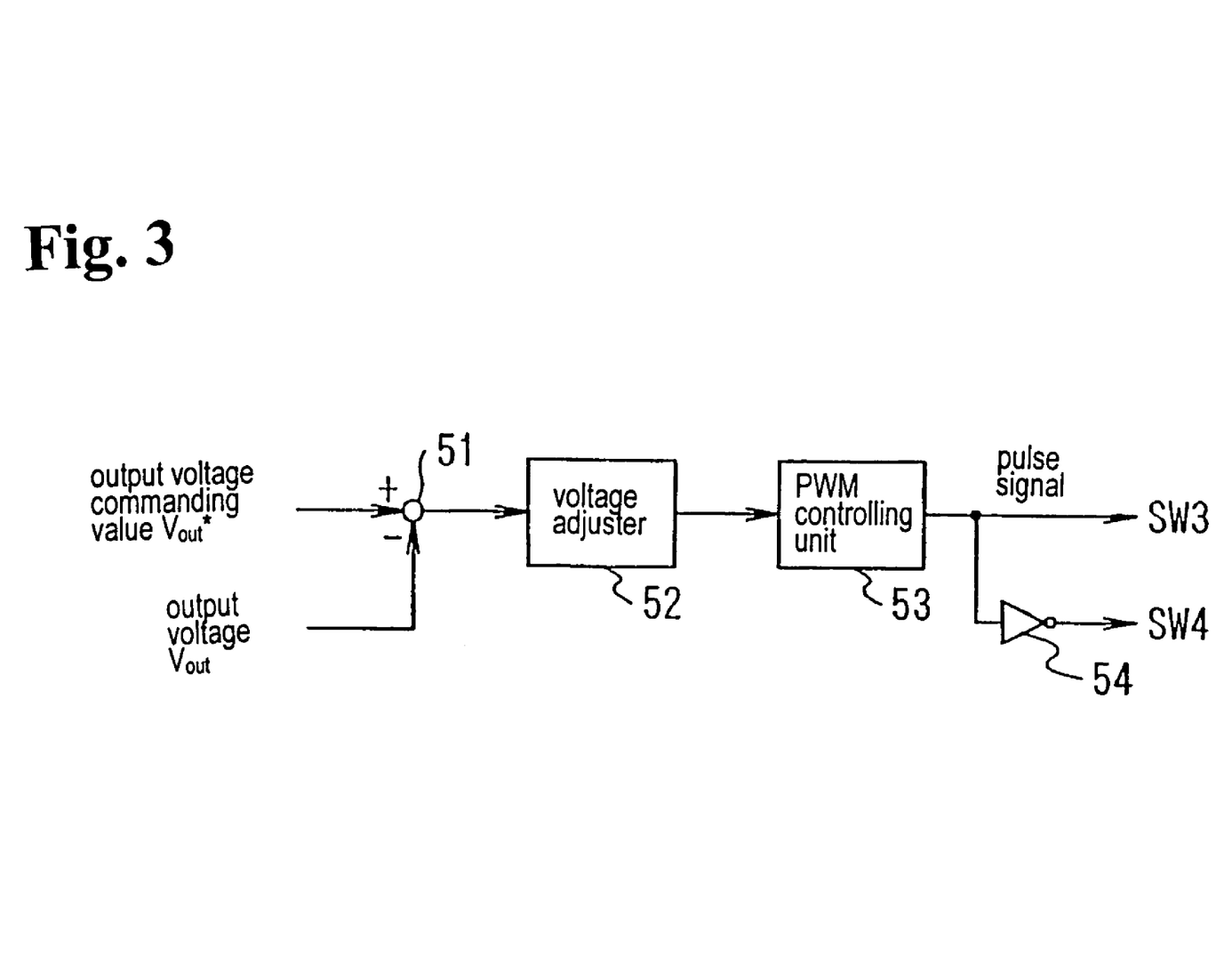
FIG. 3 is a schematic block diagram showing a functional structure of a series converter controlling unit.

FIG. 3 is a block diagram showing a functional structure of the series converter controlling unit 24. As shown in FIG. 3, an arithmetic operator 51 detects a differential value between the output voltage Vout detected by the output-current/voltage detector 31 and the specified value Vout* of the output voltage to the load. After a voltage adjuster 52 executes PI control and the like based on the differential value, a PWM controlling unit 53 generates a pulse signal as a control signal for controlling the switching element SW3 of the series converter 6 and, at the same time, a logical inversion circuit 54 inverts the pulse signal as a control signal for controlling the switching element SW4, thereby performing the PWM control of the switching elements SW3 and SW4.

With this configuration, the series converter 6 is controlled through feedback so that the output voltage Vout becomes the specified output voltage value Vout*.

When the input voltage Vin detected by the input-voltage detector 37 is within a predetermined allowable range where the input voltage Vin is considered to be normal, the switch controlling unit 26 controls the relay switch 10 to be electrically conductive, and when the input voltage Vin exceeds the predetermined allowable range, the relay switch is controlled to be in the shut-off state.

An operation of the first embodiment will be explained next.

When an input voltage from a commercial power supply source is normal, since the input voltage Vin detected by the input-voltage detector 37 is within a predetermined allowable range, the controlling circuit 20 determines that the input voltage Vin from a commercial power supply source is normal. Accordingly, the switch controlling unit 26 controls the relay switch 10 to be in the electrically conductive state. As a result, the AC power supplied from a commercial power supply source is supplied to the load (not shown) through the relay switch 10, the LC filter 2, the series converter 6, and the LC filter 8.

At this time, the series converter 6 compensates the input voltage Vin so that the output voltage Vout becomes the specified output voltage value Vout* using the electrolytic capacitor Cdc and the DC power supply source 3 as an energy source, and the compensated input voltage is supplied to the load via the LC filter 8. As a result, the AC power with a specific voltage value corresponding to the specified output voltage value Vout* is supplied to the load.

On the other hand, in the parallel converter controlling unit 22, the change-over switch 44 selects a side of the arithmetic operator 43 to input the output thereof to the arithmetic operator 45, and the parallel converter 4 performs a rectifying operation so that a current corresponding to the differential value between the specified DC voltage value Edc* and the DC voltage Edc flows through the parallel converter 4. Accordingly, when the series converter 6 compensates the output voltage Vout using the electrolytic capacitor Cdc and the DC power supply source 3 as the energy source, and the voltage at both ends of the electrolytic capacitor Cdc varies, the parallel converter 4 is operated so that the specified DC voltage value Edc* matches the DC voltage Edc.

That is, even if the voltage at both ends of the electrolytic capacitor Cdc varies when the series converter 6 compensates the output voltage Vout, the voltage at both ends of the electrolytic capacitor Cdc is maintained at the specified DC voltage value Edc* since the parallel converter 4 charges and discharges into and out from the electrolytic capacitor Cdc.

From this state, if a short circuit occurs on the input side of the AC power supply source and the value of the input voltage Vin exceeds a predetermined allowable range, the input voltage Vin decreases and the controlling circuit 20 determines that the input voltage Vin is an abnormal voltage. The series converter controlling unit 24 continuously controls the series converter 6 as before, and the series converter 6 is operated so that the output voltage Vout matches the specified output voltage value Vout*. Also, the switch controlling unit 26 controls the relay switch 10 to be in the shut off state.

On the other hand, in the parallel converter controlling unit 22, since the decrease in the input voltage Vin is detected, the parallel converter 4 is controlled using the value of the output current Iout detected by the output-current/voltage detector 31 as the specified value of the current flowing through the parallel converter 4 through the change-over switch 44.

Here, when the abnormal voltage of the input voltage Vin is detected and the relay switch 10 is controlled to be in the shut-off condition, it takes time from when the relay switch 10 is actually shut off to when the input side of the AC power supply source is disconnected. However, at the moment when the abnormal voltage of the input voltage Vin is detected, in the parallel converter controlling unit 22, the parallel converter 4 is controlled so that the current flowing through the parallel converter 4 becomes the value of the output current Iout, that is, the input current value becomes zero. This is an equivalent state before the relay switch 10 is in the shut off condition, that is, the state in which the input side of the AC power supply source is shut off at the moment when the abnormal voltage of the input voltage Vin is detected.

Accordingly, this is an equivalent state in which the input side of the AC power supply source is promptly disconnected at the moment when the abnormal voltage of the input voltage Vin is detected. Therefore, it is possible to prevent an adverse effect on the uninterruptible power supply unit itself or a device linked with the same system due to an over current flowing at a short-circuit portion, thereby improving reliability.

Also, since the series converter 6 is operated so that the output voltage Vout becomes the specified output voltage value Vout*, it is possible to prevent temporal shut-off of the output voltage Vout to the load and continuously supply the AC power with a voltage value corresponding to the specified output voltage value Vout*.

A second embodiment of the present invention will be explained next.

Figure 4:
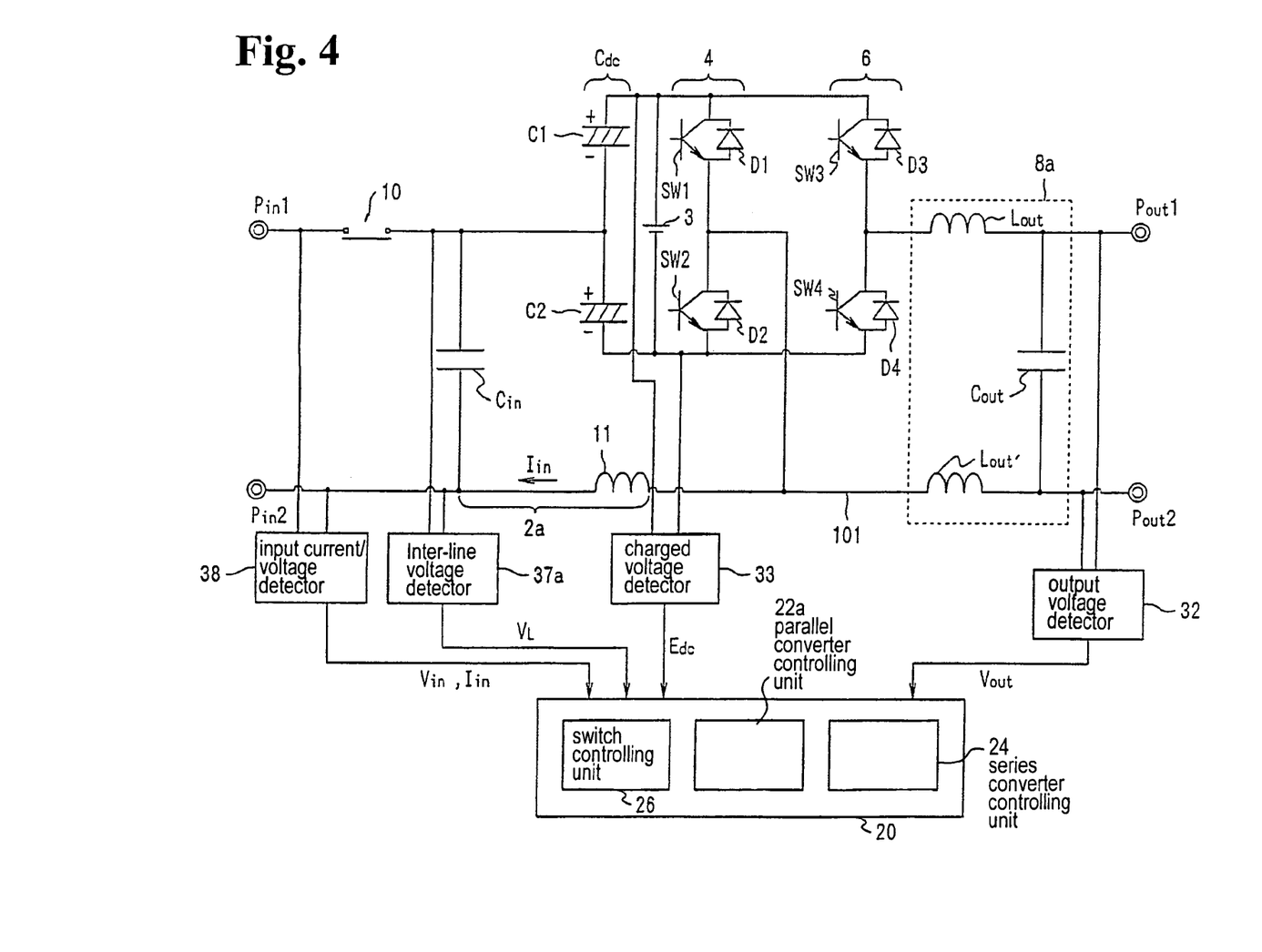
FIG. 4 is a schematic block diagram showing an example of an uninterruptible power supply unit according to a second embodiment of the present invention.

FIG. 4 is a schematic block diagram showing an example of an uninterruptible power supply unit according to the second embodiment of the present invention. According to the second embodiment, instead of the reactor Lin in the first embodiment, an input reactor 11 is disposed between a connection portion of the capacitor Cin of the power supply line 101 and a connection portion between the switching elements SW1 and SW2 of the power supply line 101, and the capacitor Cin and the input reactor 11 constitute the LC filter 2a. Further, a reactor Lout' is disposed between a connection portion of the capacitor Cout of the power supply line 101 and a connection portion between the switching elements SW1 and SW2 of the power supply line 101, and the reactors Lout, Lout' and the capacitor Cout constitute a filtering circuit 8a.

The switch controlling unit 26 and the series converter controlling unit 24 control the relay switch 10 and the series converter 6, respectively, as in the first embodiment of the present invention, and a parallel converter controlling unit 22a controls the parallel converter 4. Note that components same as those in the first embodiment are designated by the same reference numerals and symbols, and detailed descriptions thereof are omitted.

Figure 5:
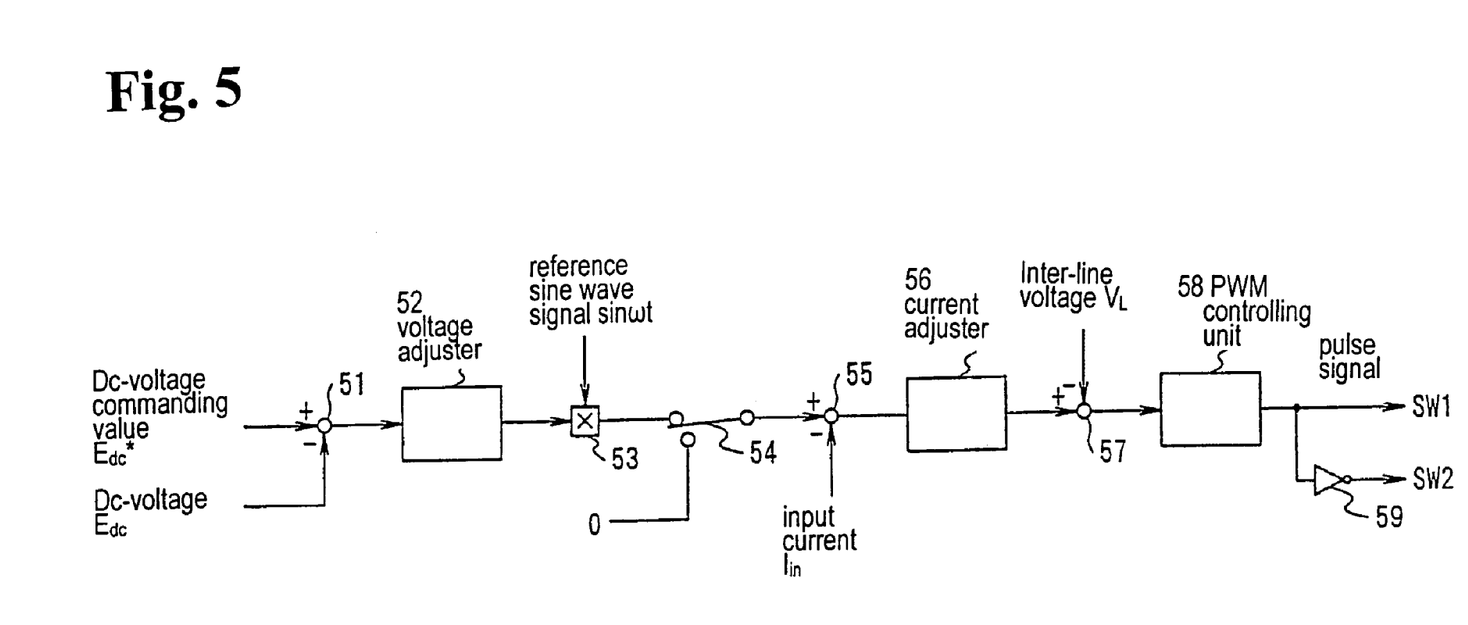
FIG. 5 is a schematic block diagram showing a functional structure of a parallel converter controlling unit shown in FIG. 4.

The parallel converter controlling unit 22a in the second embodiment is constituted as a block diagram shown in FIG. 5.

As shown in FIG. 5, an arithmetic operator 51 detects a differential value between the DC-voltage Edc at both ends of the electrolytic capacitor Cdc detected by the charged voltage detector 33 and the specified DC voltage value Edc* thereof. A voltage adjuster 52 executes a voltage-adjusting arithmetic operation such as PI control, and an arithmetic operator 53 multiplies a result of the arithmetic operation and the reference sine wave signal sin ωt. Incidentally, the reference sine wave signal sin ωt is a signal with a phase synchronized with a inter-line voltage $V_L$, and an amplitude of the reference sine wave signal is arbitrarily determined, for example, in correspondence with the rated voltage of the input voltage from a commercial power supply source.

A result of the multiplication at the arithmetic operator 53 and a commanding value of "0" is selectively output to an arithmetic operator 55 through a change-over switch 54. The arithmetic operator 55 computes a differential value between the result obtained at the arithmetic operator 53 or the commanding value "0" selectively input and an input current Iin flowing through an input reactor 11 detected by an input current/voltage detector 38. A current adjuster 56 executes a current adjusting operation so that the differential value becomes zero, and an arithmetic operator 57 computes a differential value between the result computed by the current adjuster 56 and the inter-line voltage $V_L$ detected by an inter-line voltage detector 37a.

Based on the computed result, a PWM controlling unit 58 generates a pulse signal for controlling the parallel converter 4. At this time, the parallel converter 4 performs a rectifying operation, and a pulse signal is generated so that the input current Iin matches a current value corresponding to the differential value between the specified DC voltage value Edc* and the DC voltage Edc, or the input current Iin becomes zero. The pulse signal is output as a signal for controlling the switching element SW1 of the parallel converter 4 and, at the same time, a logical inversion circuit 59 inverts the pulse signal and the inverted signal is output as a signal for controlling the switching element SW2.

When the input voltage Vin detected by the input current/voltage detector 38 is within a predetermined allowable range where the input voltage Vin is considered to be normal, the change-over switch 54 outputs the result computed by the arithmetic operator 53 to the arithmetic operator 55, and when the input voltage Vin exceeds the predetermined allowable range, the changeover switch 54 outputs the commanding value "0" to the arithmetic operator 55.

That is, when the input voltage Vin is normal, the parallel converter controlling unit 22a controls the parallel converter 4 so that the input current Iin matches a current value corresponding to the differential value between the specified DC voltage value Edc* and the DC voltage Edc. Conversely, when the input voltage Vin is abnormal, the parallel converter 4 is controlled so that the input current Iin becomes zero. Incidentally, the input current Iin is not necessary to be zero, and a small current value relative to the rated current applied to the uninterruptible power supply unit shown in FIG. 4 may be acceptable, i.e. a current value small enough so that there is no adverse effect on the uninterruptible power supply unit and a device linked to the same system due to a current flowing upon power outage at the input side of the AC power supply source. It is preferred to be "0" in view of reliability.

An operation of the second embodiment will be explained next.

When an input voltage from a commercial power supply source is normal, since the input voltage Vin detected by the input-voltage detector 38 is within a predetermined allowable range, the controlling circuit 20 determines that the input voltage Vin is normal. Accordingly, the switch controlling unit 26 controls the relay switch 10 to be in the electrically conductive state. As a result, the AC power supplied from a commercial power supply source is supplied to the load (not shown) through the relay switch 10, the LC filter 2, the series converter 6, and the LC filter 8. At this time, the series converter 6 compensates the input voltage from a commercial power supply source so that the output voltage Vout becomes the specified output voltage value Vout* using the electrolytic capacitor Cdc and the DC power supply source 3 as an energy source, and the output voltage is supplied to the load via the LC filter 8. As a result, the AC power with a specific voltage value corresponding to the specified output voltage value Vout* is supplied to the load regardless of the voltage value of the AC input.

On the other hand, in the parallel converter controlling unit 22a, the change-over switch 54 selects a side of the arithmetic operator 53 to input the output thereof to the arithmetic operator 55. Accordingly, the parallel converter 4 performs a rectifying operation with a current corresponding to the differential value between the specified DC voltage value Edc* and the DC voltage Edc as a target value of the input current Iin. When the series converter 6 compensates the output voltage Vout using the electrolytic capacitor Cdc and the DC power supply source 3 as the energy source, and the voltage at both ends of the electrolytic capacitor Cdc varies, the parallel converter 4 is operated with the current corresponding to the differential value between the specified DC voltage value Edc* match the DC voltage Edc as the target value of the input current Iin.

Accordingly, even if the voltage at both ends of the electrolytic capacitor Cdc varies when the series converter 6 compensates the output voltage Vout, the voltage at both ends of the electrolytic capacitor Cdc is maintained at the specified DC voltage value Edc* since the parallel converter 4 charges and discharges into and out from the electrolytic capacitor Cdc.

From this state, if a short circuit occurs at the input side of the AC power supply source and the value of the input voltage Vin exceeds a predetermined allowable range, the input voltage Vin decreases and the controlling circuit 20 determines that the input voltage Vin is an abnormal voltage. The series converter controlling unit 24 continuously controls the series converter 6 as before, and the series converter 6 is operated so that the output voltage Vout matches the specified output voltage value Vout*.

On the other hand, in the parallel converter controlling unit 22a, since the decline of the input voltage Vin is detected, the parallel converter 4 is controlled with the commanding value "0" as a specified value of the input current Iin through the change-over switch 54.

Here, when the abnormal voltage of the input voltage Vin is detected and the relay switch 10 is controlled to be in the shut-off condition, it takes time until the relay switch 10 is in the shut off state and the input side of the AC power supply source is disconnected. However, at the moment when the abnormal voltage of the input voltage Vin is detected, in the parallel converter controlling unit 22, the parallel converter 4 is controlled so that the input current Iin becomes zero. This is an equivalent state before the relay switch 10 is in a shut off condition, i.e. the state in which the input side of the AC power supply source is shut off at the moment when the abnormal voltage of the input voltage Vin is detected.

Accordingly, when short circuit and the like happens, it is possible to prevent an adverse effect on the uninterruptible power supply unit itself or a device linked with the same system due to an over current flowing at a short-circuit portion, thereby improving reliability.

At this time, since the series converter 6 is operated so that the output voltage Vout becomes the specified output voltage value Vout* using the electrolytic capacitor Cdc and the DC power supply source 3 as the energy source, the AC power with a voltage value corresponding to the specified output voltage value Vout* is continuously supplied to the load, and it is possible to prevent temporal shut-off of the output voltage Vout.

In the first and second embodiments, it is stated that the parallel converter 4 and the series converter 6 are respectively formed of a half-bridge circuit comprising the switching elements and diodes connected in opposite parallel, however, the present invention is not limited thereto, and a full-bridge may be applicable.

In the first and second embodiments, the relay switch 10 corresponds to a power supply switch; the parallel converter 4 corresponds to a parallel converter; the electrolytic capacitor Cdc and the DC power supply source 3 correspond to electricity storage means; the series converter 6 and the series converter controlling unit 24 correspond to a series converter; the input-voltage detector 37 or the input current/voltage detector 38 corresponds to voltage abnormality detection means; the switch controlling unit 26 and the parallel converter controlling unit 22 or 22a correspond to controlling means; and the input reactor 11 corresponds to an input reactor.

A third embodiment of the present invention will be explained next.

Figure 6:
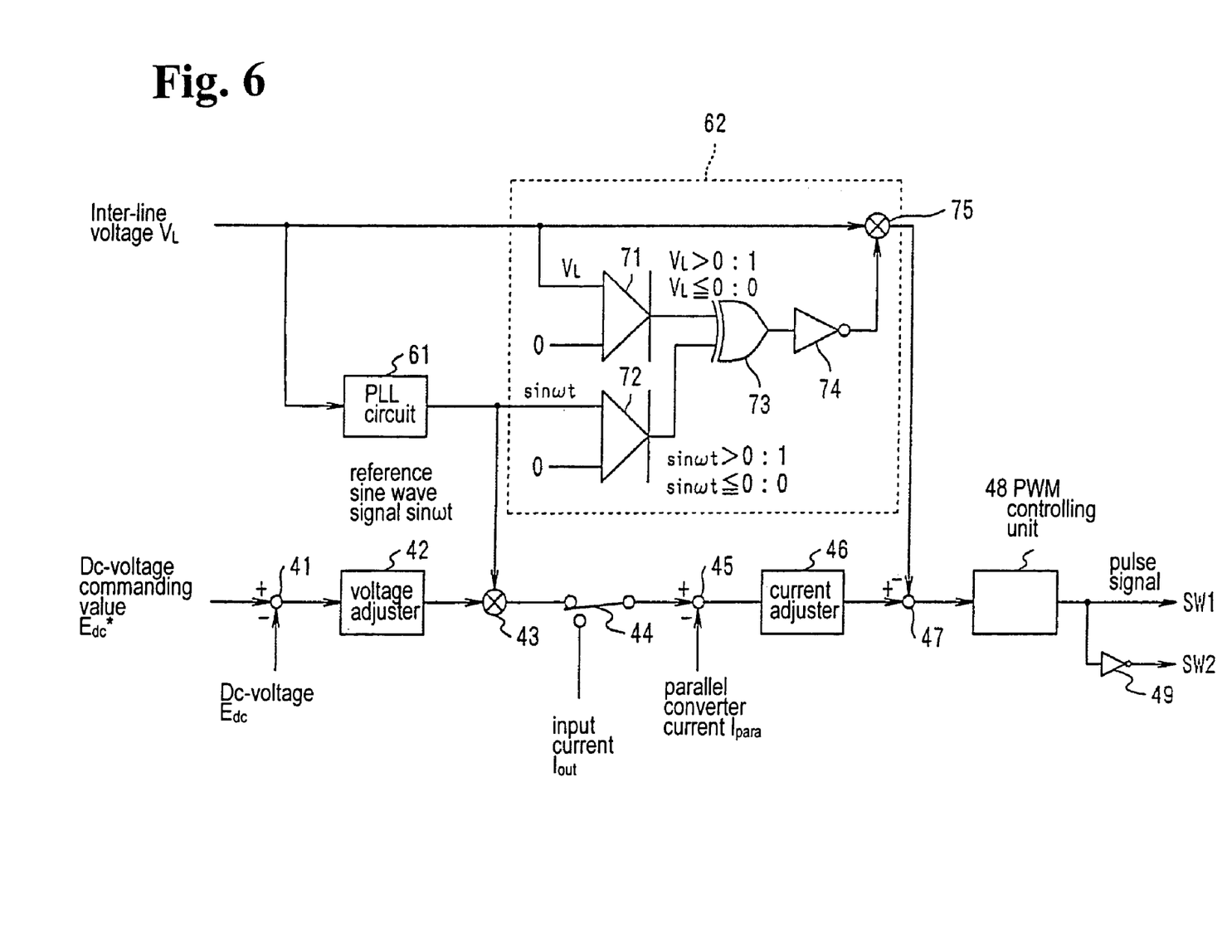
FIG. 6 is a schematic block diagram showing a functional structure of a parallel converter controlling unit according to a third embodiment of the present invention.

According to the third embodiment, in the first embodiment, all components are the same except that the parallel converter controlling unit 22 has a different configuration, and the same components are designated by the same reference numerals and descriptions thereof are omitted.

As shown in FIG. 6, in the parallel converter controlling unit 22 of the first embodiment shown in FIG. 2, the parallel converter controlling unit 22 of the third embodiment further includes a PLL circuit 61 and a limiter circuit 62.

The PLL circuit 61 inputs the inter-line voltage $V_L$ detected by the inter-line voltage detector 37a, so that the reference sine wave signal sin ωt having a phase synchronized with that of the inter-line voltage $V_L$ is generated and input to the arithmetic operator 43.

As shown in FIG. 6, the limiter circuit 62 comprises a comparator 71 for comparing the inter-line voltage $V_L$ with the reference value "0" [V]; a comparator 72 for comparing the reference sine wave signal sin ωt from the PLL circuit 61 with the reference value "0"; an EOR circuit 73 for receiving outputs from the comparators 71 and 72 as inputs and for outputting an exclusive sum thereof; a NOT circuit 74 for inverting output of the EOR circuit 73; and an arithmetic operator 75 for multiplying the input voltage Vin and output of the NOT circuit 74 so that output of the arithmetic operator 75 is output to the arithmetic operator 47.

The comparator 71 compares the inter-line voltage $V_L$ with the reference value "0" [V], and when the value of the inter-line voltage $V_L$ is greater than the reference value "0", the comparator 71 outputs a logical value "1", and when the value of the inter-line voltage $V_L$ is less than the reference value "0", the comparator 71 outputs a logical value "0". The comparator 72 compares the reference sine wave signal sin ωt with the reference value "0", and when the value of the reference sine wave signal sin ωt is greater than the reference value "0", the comparator 72 outputs the logical value "1", and when the value of the reference sine wave signal sin ωt is less than the reference value "0", the comparator 72 outputs the logical value "0".

That is, when a sign of the inter-line voltage $V_L$ matches a sign of the reference sine wave signal sin ωt, the NOT circuit 74 outputs the logical value "1", and when they do not match, the NOT circuit 74 outputs the logical value "0". Since one of them is multiplied by the inter-line voltage $V_L$, when the sign of the inter-line voltage $V_L$ matches the sign of the reference sine wave signal sin ωt, the inter-line voltage $V_L$ is input to the arithmetic operator 47, and when they do not match, "0" is input.

The arithmetic operator 47 makes the output of the arithmetic operator 75 an opposite voltage for changing control characteristics in the parallel converter controlling unit 22 relative to the parallel converter 4, and a differential value between the opposite voltage and the output of the current adjuster 46 is obtained and output to the PWM controlling unit 48, so that a pulse signal to the parallel converter 4 is generated based on the value.

Accordingly, in the third embodiment, when the input voltage Vin from a commercial power supply source is normal and the relay switch 10 is controlled to be in the conductive state, the input voltage Vin is detected as the inter-line voltage $V_L$, and the sign thereof matches the sign of the reference sine wave signal sin ωt from the PLL circuit 61. Accordingly, the inter-line voltage $V_L$ is input to the arithmetic operator 47 as the opposite voltage, and an operation is similar to that of the first embodiment.

On the other hand, when a short circuit occurs at the input side of the AC power supply source and the input voltage Vin exceeds a predetermined allowable range, the input voltage Vin decreases and the controlling circuit 20 determines that the input voltage Vin is an abnormal voltage. The parallel converter 4 is controlled with the value of the output current Iout detected by the output-current/voltage detector 31 as the commanding value of the current flowing through the parallel converter 4 through the change-over switch 44, and the relay switch 10 is controlled to be in the shut off state.

With this operation, the state is equivalent to that before the relay switch 10 is fully shut off, i.e. the state that the input side of the AC power supply source is disconnected at the moment when the abnormality of the input voltage Vin is detected.

Here, when the input voltage Vin is in the normal state, the parallel converter controlling unit 22 executes a control operation with a sum of the differential value between the specified DC voltage value Edc* and the DC voltage Edc, a output voltage of the current adjuster 46 corresponding to the difference from the parallel converter current Ipara, and the inter-line voltage $V_L$, i.e. the input voltage Vin, as the opposite voltage, as the commanding value of the PWM controlling unit 48. At this time, since an adjustable voltage for controlling the current corresponding to the voltage output from the current adjuster 46 is negligible, the output voltage of the parallel converter 4 is substantially equal to the opposite voltage, i.e. the inter-line voltage $V_L$.

From this state, when the input side of the AC power supply source is cut off, the output voltage of the parallel converter 4 is detected as the inter-line voltage $V_L$, and is input to the arithmetic operator 47 as the opposite voltage. Accordingly, in the parallel converter controlling unit 22, the output voltage of the parallel converter 4 is detected and the parallel converter 4 is controlled to output a voltage equivalent to the detected voltage, so that the output voltage is maintained at a constant voltage.

Here, the series converter 6 is operated such that the output voltage Vout matches the specified output voltage value Vout*. However, in the state that the input side of the AC power supply source is disconnected, since the output voltage of the parallel converter 4 is detected as the output voltage Vout, the series converter 6 executes a compensating operation so that the output voltage Vout maintained at a substantially constant voltage becomes the AC specified output voltage value Vout*. Accordingly, in a case that the output voltage Vout, i.e. the output voltage of the parallel converter 4 maintained at a substantially constant level, is within a voltage compensation range of the series converter 6, the series converter 6 is enabled to compensate the value to be the specified output voltage value Vout*. However, in a case that the output voltage of the parallel converter 4 exceeds the voltage compensation range of the series converter 6, it is no longer possible to satisfy the specified output voltage value Vout*, thereby decreasing the output voltage. That is, for example, when the voltage compensation range of the series converter 6 is set to be 0 to ±100% and the output voltage of the parallel converter 4 is maintained at a value at the positive (+) side, for example, X [V], since it is not possible to compensate toward the negative (−) side, the output voltage Vout decreases.

However, in the limiter circuit 62, it is compared whether the detected inter-line voltage $V_L$ and the reference sine wave signal sin ωt synchronized with the inter-line voltage $V_L$ have the same sign. As described above, when the input side of the AC power supply source is disconnected and the voltage output of the parallel converter 4 becomes a substantially constant voltage, the output voltage is detected as the inter-line voltage $V_L$. Since the signs of the reference sine wave signal sin ωt and the inter-line voltage $V_L$ do not match, zero voltage is output to the arithmetic operator 47 as the opposite voltage.

Accordingly, in the parallel converter controlling unit 22, the parallel converter 4 is controlled with the voltage adjustment for controlling the current output from the current adjuster 46 as the commanding value. However, since the voltage-adjustment for controlling the current is negligible, the output voltage of the parallel converter 4 becomes substantially zero, and the series converter 6 is operated to output the specified output voltage value Vout*.

Accordingly, when the voltage compensation range of the series converter 6 is set to be 0 to ±100%, since the output voltage of the parallel converter 4 is within the voltage compensation range, in the series converter 6, is it possible to compensate the output voltage to the load to be the specified output voltage value Vout*.

Accordingly, it is possible to prevent the output voltage Vout from declining, and even when an abnormal condition happens at the input side of the AC power supply source, it is possible to supply the power stably without temporal shut out or disconnection.

In the third embodiment described above, it is stated that the PLL circuit 61 and the limiter circuit 62 are added to the parallel converter controlling unit 22a in the first embodiment. This is also applicable to the second embodiment.

Figure 7:
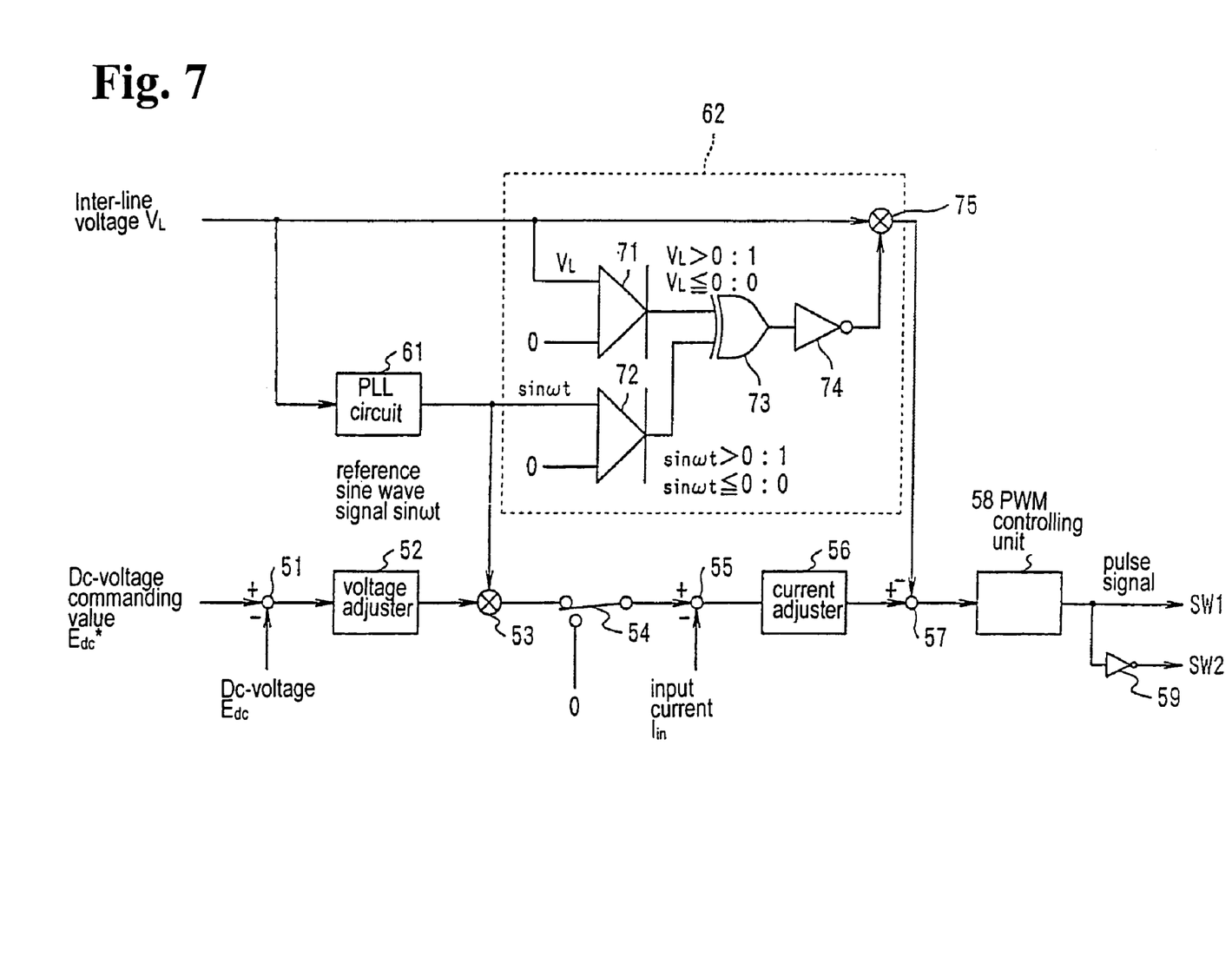
FIG. 7 is a schematic block diagram showing a functional structure of a parallel converter controlling unit according to a further embodiment of the present invention.

In this case, as shown in FIG. 7, in the parallel converter controlling unit 22a shown in FIG. 5, the PLL circuit 61 and the limiter circuit 62 are added. When the sign of the inter-line voltage VL matches the sign of the reference sine wave signal sin ωt, the inter-line voltage VL is output to the arithmetic operator 57 as the opposite voltage, and when the sign of the inter-line voltage VL does not match the sign of the reference sine wave signal sin ωt, voltage 0 is output to the arithmetic operator 57 as the opposite voltage.

Accordingly, in this case, as described above, when the input side of the AC power supply source is disconnected, the output voltage of the parallel converter 4 is detected as the inter-line voltage $V_L$, and the detected voltage is output to the arithmetic operator 47 as the opposite voltage, so that the output voltage of the parallel converter 4 is maintained at a substantially constant voltage. At a moment when the substantially constant voltage is detected as the inter-line voltage $V_L$ and the sign of the reference sine wave signal sin ωt does not match the sign of the inter-line voltage VL, zero voltage is output to the arithmetic operator 47 as the opposite voltage.

Accordingly, the output voltage of the parallel converter 4 becomes substantially zero, and the series converter 6 is capable of correcting the output voltage to be the specified output voltage value Vout*, so that the output voltage Vout to the load is maintained at the specified output voltage value Vout*. Accordingly, even when an abnormal condition happens at the input side of the AC power supply source, it is possible to supply the power stably without temporal shut out or disconnection.

Incidentally, in the third embodiment, it is stated that when an abnormality happens at the input side of the AC power supply source, the voltage 0 is input as the opposite voltage. However, it is not limited thereto, and it is set according to the compensation range of the series converter 6. In short, when the input side of the AC power supply source is disconnected, the appropriate opposite voltage is set such that the output voltage of the parallel converter 4 becomes a specific value that the series converter 6 can maintain the output voltage Vout to the load at the predetermined specified output voltage value Vout*.

In the third embodiment, it is stated that the limiter circuit 62 switches the opposite voltage to the arithmetic operator 47. However, it is not limited thereto, and it is possible to apply switching means for switching the corresponding voltage value to the zero voltage upon the detection when the opposite voltage is abnormal, i.e. the output voltage of the parallel converter 4 is varied due to a change in the opposite voltage, and the value becomes such that the series converter 6 can not maintain the output voltage Vout at the specified output voltage value Vout*.

As described above, according to the uninterruptible power supply unit of the first to third aspects of the present invention, when the AC input voltage is abnormal, the parallel converter is operated such that the value of the current flowing through the parallel converter becomes the value of the AC output current and the value of the AC input current becomes zero, or the parallel converter is operated such that the value of the AC input current become less than a predetermined allowable value such as zero, for example, thereby creating the state equivalent to the state in which the input side of the AC power supply source is disconnected. As a result, in the case that the power supply switch is shut off upon the detection of an abnormal voltage of the AC input and the parallel converter is controlled so that the value of the AC input current becomes zero, it is possible to make the input side of the AC power supply source the state equivalent to the state that the input side of the AC power supply source is disconnected at the moment when the parallel converter starts controlling to make the value of the AC input current zero before the power supply switch is shut off. With this configuration, it is possible to prevent the adverse effect on the uninterruptible power supply unit itself or a device linked to the same system due to over current flowing at a short-circuit portion, thereby improving reliability.

Further, at this time, since the series converter is operated such that the AC output voltage becomes the commanding value, it is possible to continuously supply the AC output at a specific voltage value and prevent the temporal shut out state.

In the uninterruptible power supply unit of the fourth to sixth aspects, the parallel converter is operated with the voltage at both ends of the conductive path connecting between the power supply lines disposed between the power supply switch and the parallel converter as the opposite voltage. When an abnormality happens in the voltage at both ends of the conductive path, the rated voltage is used as the opposite voltage in place of the voltage at both ends of the conductive path. The rated voltage is set to be a value such as zero so that the series converter can correct the output voltage of the parallel converter, i.e. the AC output voltage at the output terminal, to be a predetermined value while the power supply switch is shut off. Accordingly, it is possible to continuously supply the AC output with a predetermined voltage value, and prevent the temporal shut out.

The invention claimed is:

1. An uninterruptible power supply unit for receiving AC power input and supplying AC power output, comprising:
   a power supply line including a first power supply line having first input and output terminals, and a second power supply line having second input and output terminals,
   a power supply switch interposed in the first power supply line for connecting and disconnecting the first power supply line,
   a parallel converter connected between the power supply switch and the first output terminal parallel to the first and second input and output terminals,
   a conductive path for connecting the first and second power supply lines between the power supply switch and the parallel converter,
   electrical power storage means connected to the parallel converter for storing electrical power,
   a series converter connected to the first power supply line in series between the parallel converter and the first output terminal for maintaining a voltage of the AC power output at the first output terminal at a predetermined value using the electrical power storage means as an energy source,
   voltage abnormality detection means connected to the first and second input terminals for detecting an abnormality of the AC power input at the first and second input terminals, and
   controlling means connected to the power supply switch, the parallel converter and the voltage abnormality detection means for controlling the power supply switch and the parallel converter in response to a result detected by the voltage abnormality detection means, said controlling means, when the voltage abnormality detection means detects no abnormality, controlling the power supply switch to connect the first power supply line and controlling the parallel converter so that the electrical energy stored in the electrical power storage means has a predetermined value, and when the voltage abnormality detection means detects the abnormality, controlling the power supply switch to disconnect the first power supply lines and the parallel converter.

2. An uninterruptible power supply unit according to claim 1, wherein when the voltage abnormality detection means detects the abnormality, said controlling means controls the parallel converter so that a value of a current flowing through the parallel converter matches a value of a current of the AC power output at the first output terminal.

3. An uninterruptible power supply unit according to claim 1, further comprising an input reactor disposed between the second input terminal and the parallel converter.

4. An uninterruptible power supply unit according to claim 3, wherein when the voltage abnormality detection means detects the abnormality, said controlling means controls the parallel converter so that an input current value of the AC input power at the first input terminal is lower than a predetermined value.

5. An uninterruptible power supply unit according to claim 4, wherein when the voltage abnormality detection means detects the abnormality, said controlling means controls the parallel converter so that a value of a current of the AC power input at the first input terminal becomes zero.

6. An uninterruptible power supply unit according to claim 1, further comprising conductive path voltage abnormality detection means connected to two ends of the conductive path for detecting an abnormality in a voltage therebetween, said controlling means controlling the parallel converter using the voltage at the two ends of the conductive path as an opposite voltage for improving control precision relative to the parallel converter, said controlling means, when the conductive path abnormality detection means detects the abnormality, controlling the parallel converter using a predetermined rated voltage as the opposite voltage.

7. An uninterruptible power supply unit according to claim 6, wherein said rated voltage is set to be a value so that the voltage at the two ends of the conductive path when the conductive path abnormality detection means detects the abnormality is within a voltage range such that the series converter can compensate.

8. An uninterruptible power supply unit according to claim 6, wherein said rated voltage is zero voltage.

* * * * *

UNITED STATES PATENT AND TRADEMARK OFFICE
CERTIFICATE OF CORRECTION

| | |
|---|---|
| PATENT NO. | : 7,023,109 B2 |
| APPLICATION NO. | : 10/487767 |
| DATED | : April 4, 2006 |
| INVENTOR(S) | : Isao Amano |

It is certified that error appears in the above-identified patent and that said Letters Patent is hereby corrected as shown below:

Please change column 1, line 18, "are-connected" to --are connected--, and

Column 9, line 44, "a inter-line" to -- an inter-line--.

Signed and Sealed this

Eleventh Day of July, 2006

JON W. DUDAS
*Director of the United States Patent and Trademark Office*